July 24, 1956

G. C. KNUTSON 2,756,112

SILO UNLOADER

Filed Dec. 18, 1952

INVENTOR
GLENN C. KNUTSON

BY *Parker and Walsh.*
ATTORNEY

July 24, 1956

G. C. KNUTSON 2,756,112

SILO UNLOADER

Filed Dec. 18, 1952

INVENTOR
GLENN C. KNUTSON

Parker and Walsh
ATTORNEY

July 24, 1956

G. C. KNUTSON 2,756,112

SILO UNLOADER

Filed Dec. 18, 1952

INVENTOR
GLENN C. KNUTSON

BY *Parker and Walsh.*
ATTORNEY

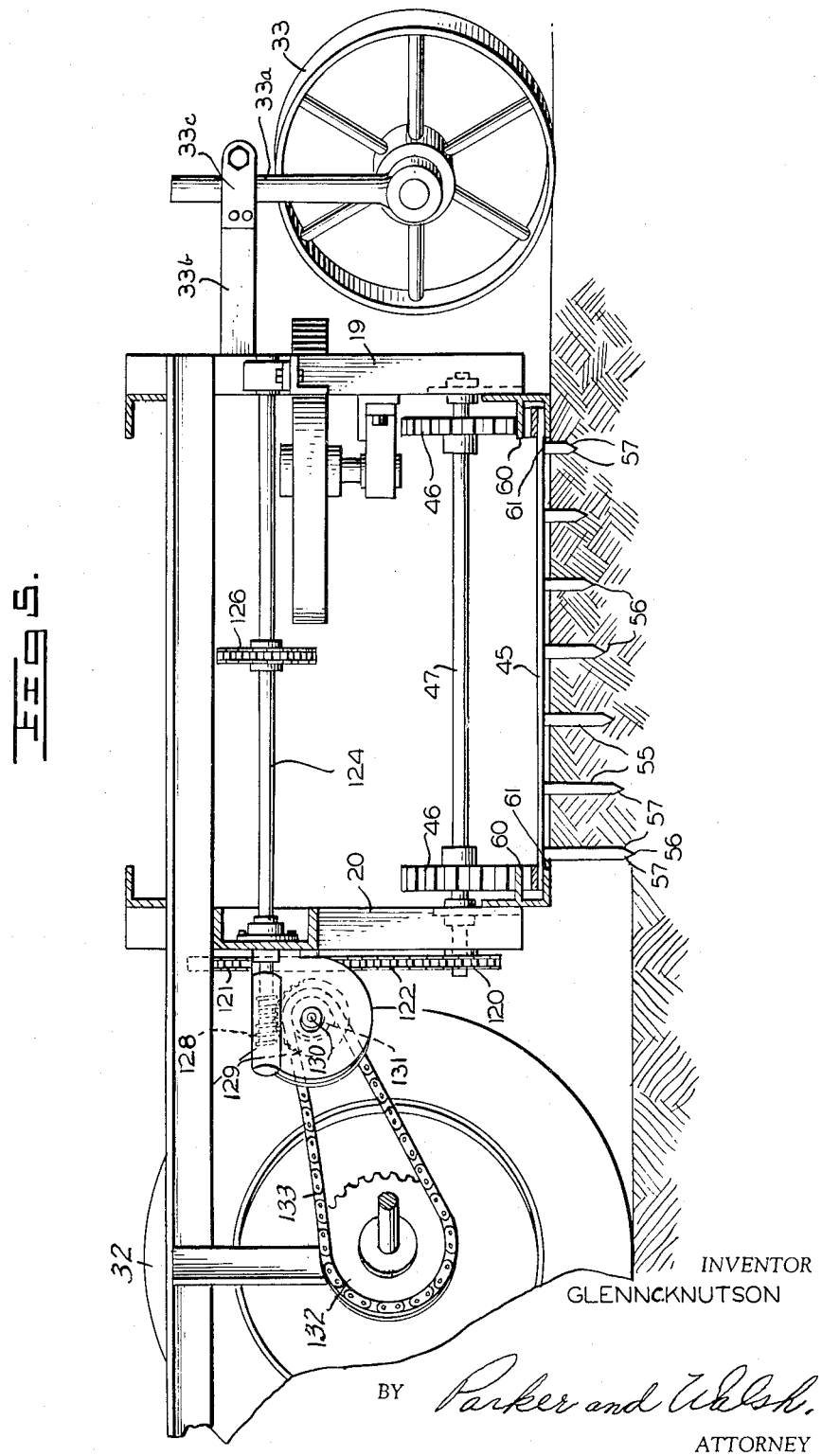

United States Patent Office 2,756,112
Patented July 24, 1956

2,756,112

SILO UNLOADER

Glenn C. Knutson, Centerville, S. Dak.

Application December 18, 1952, Serial No. 326,671

10 Claims. (Cl. 302—56)

This invention relates to apparatus for unloading and/or dispensing silage from silos and aims generally to improve the construction and operation of apparatus of this type.

A principal object of the invention is the provision of a unitary self-contained apparatus of the indicated type which is adapted to be operatively positioned in a silo without alteration of the structure thereof, and without the use of special fixtures or supporting means such as cables, brackets and the like.

Another object of the invention is the provision of apparatus of the indicated type which will unload substantially more silage from a silo, in a given period of time, than prior apparatus for this purpose.

Still another object of this invention is the provision of apparatus of the indicated type which will cut and remove frozen silage, as well as densely compacted unfrozen silage.

A further object of the invention is the provision of apparatus of the indicated type comprising a mobile type chassis or frame adapted to be supported in a silo solely by the bed of material therein for movement therearound.

A still further object of the invention is the provision of apparatus of the indicated type wherein means are provided for maintaining the apparatus in a substantially level position, thereby insuring a constant depth of penetration of the silage engaging and removing means, as it moves around the silo.

Another object of the invention is the provision of apparatus of the indicated type wherein the silage is cut, or otherwise dislodged, and moved along a substantially radial path to a centrally disposed elevating mechanism which lifts the material upwardly and dumps it into a receiving trough or receptacle for delivery to a pneumatic discharge device.

Still another object of the invention is the provision of apparatus of the indicated type in which the mechanism for cutting and moving the silage has a substantially radial, as well as a circular component of movement, thereby effecting a more rapid dislodgment and movement of a given mass of the material to a centrally disposed collecting receptacle.

A further object of the invention is the provision of apparatus of the indicated type wherein a means is provided for distributing the load of the silage engaging and moving mechanism, thereby equalizing the stresses to which such mechanism is subjected, especially where frozen silage is handled.

Still another object of the invention is the provision of apparatus of the indicated type wherein the silage is cut and separated from the main bed of the material in the silo prior to delivery to a pneumatic discharge device, thereby effecting a more efficient and a more rapid discharge of the material than is possible when the silage is pneumatically discharged directly from the bed of the material.

These and other objects and advantages of the invention will become more apparent from the following detailed description, taken with the accompanying drawing, wherein.

Figure 6:
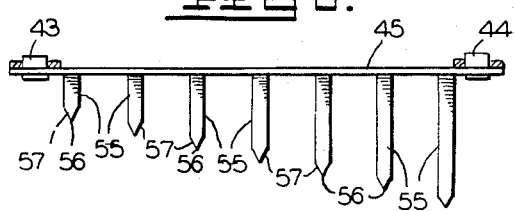
Figure 2:
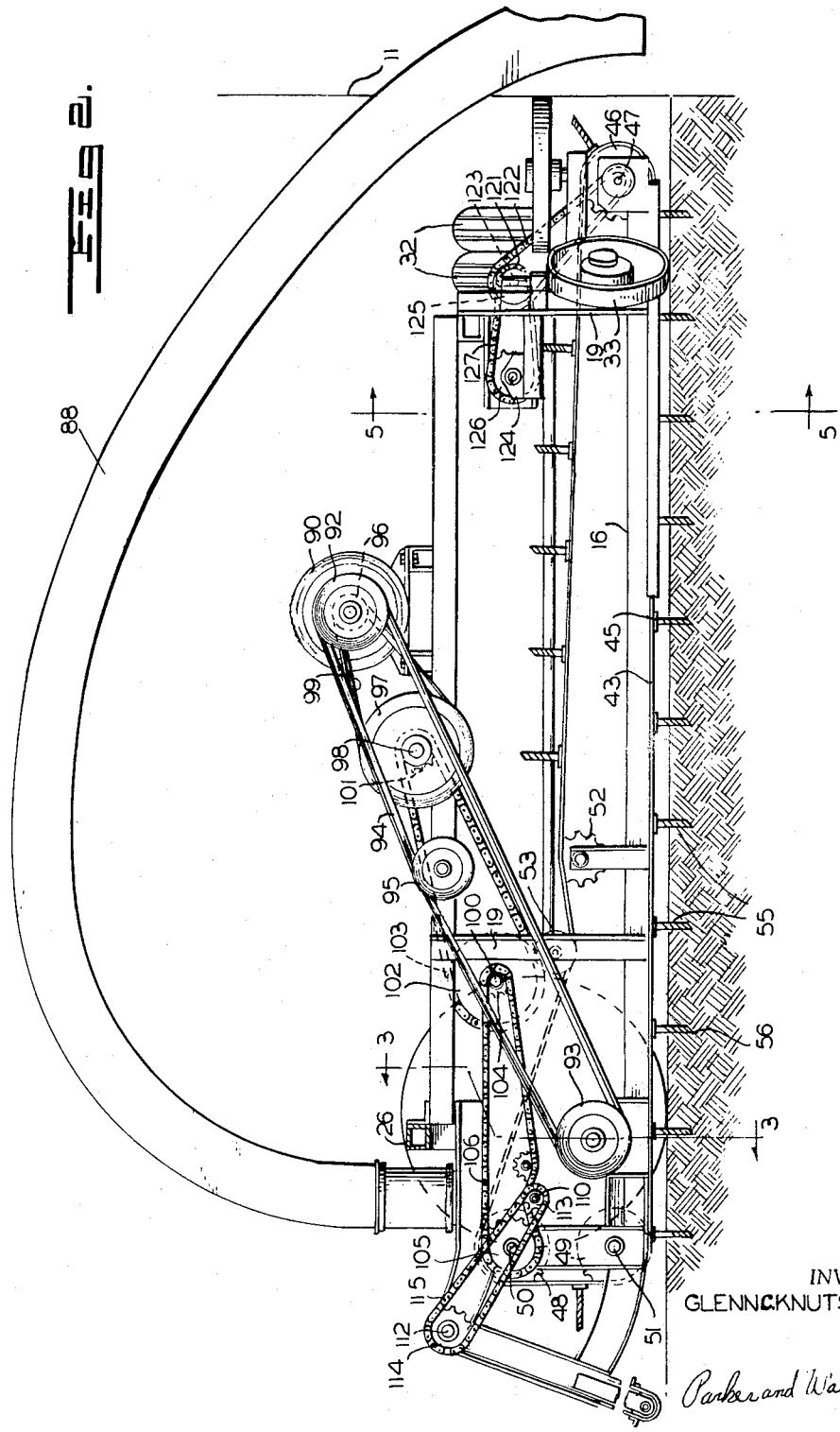
Figure 2 is a side elevational view of the apparatus, viewed from the line 2—2 of Figure 1, but with the discharge chute in the position it occupies when the rotating part of the apparatus passes thereunder.
Figure 3:
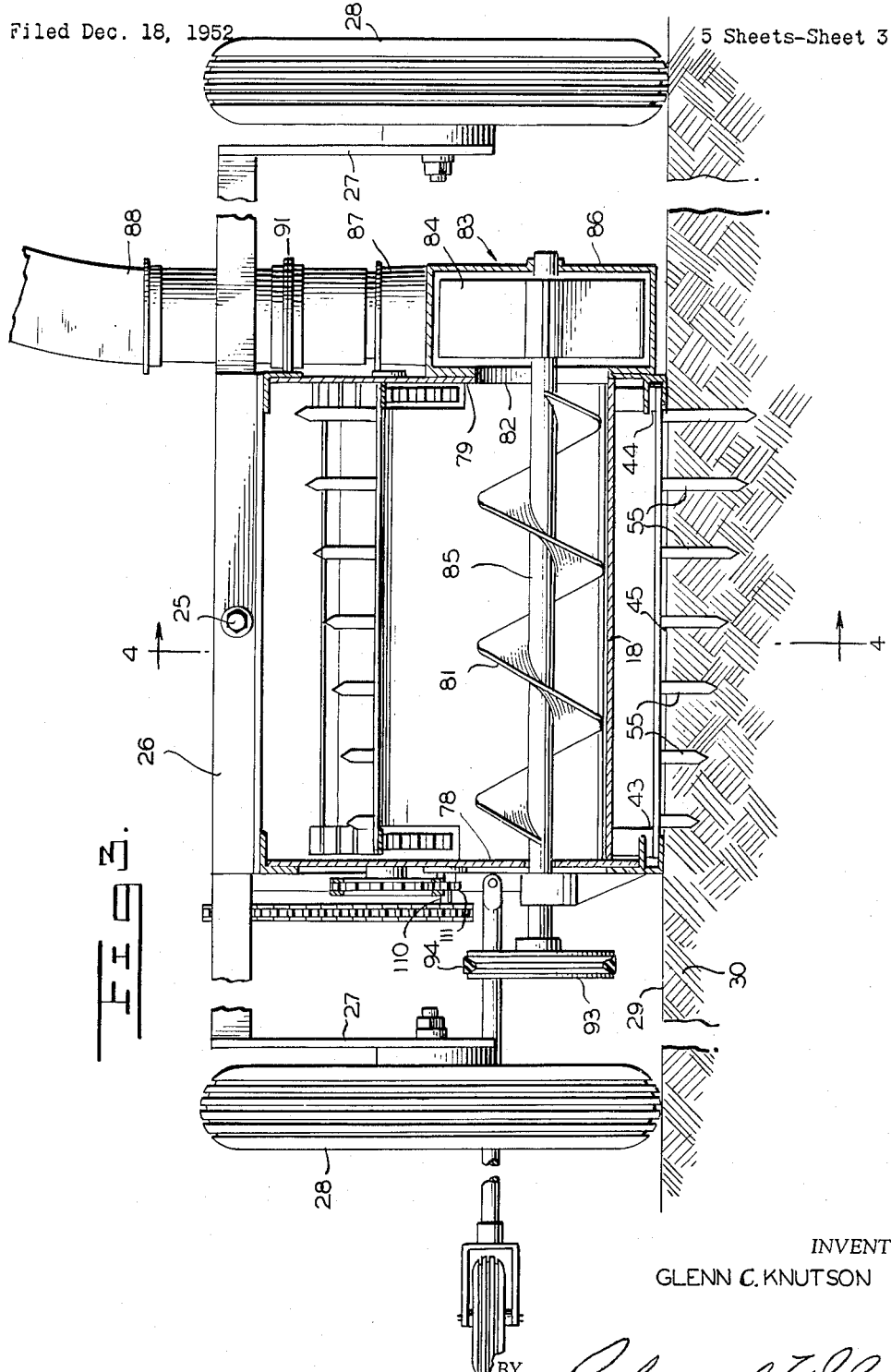
Figure 4:
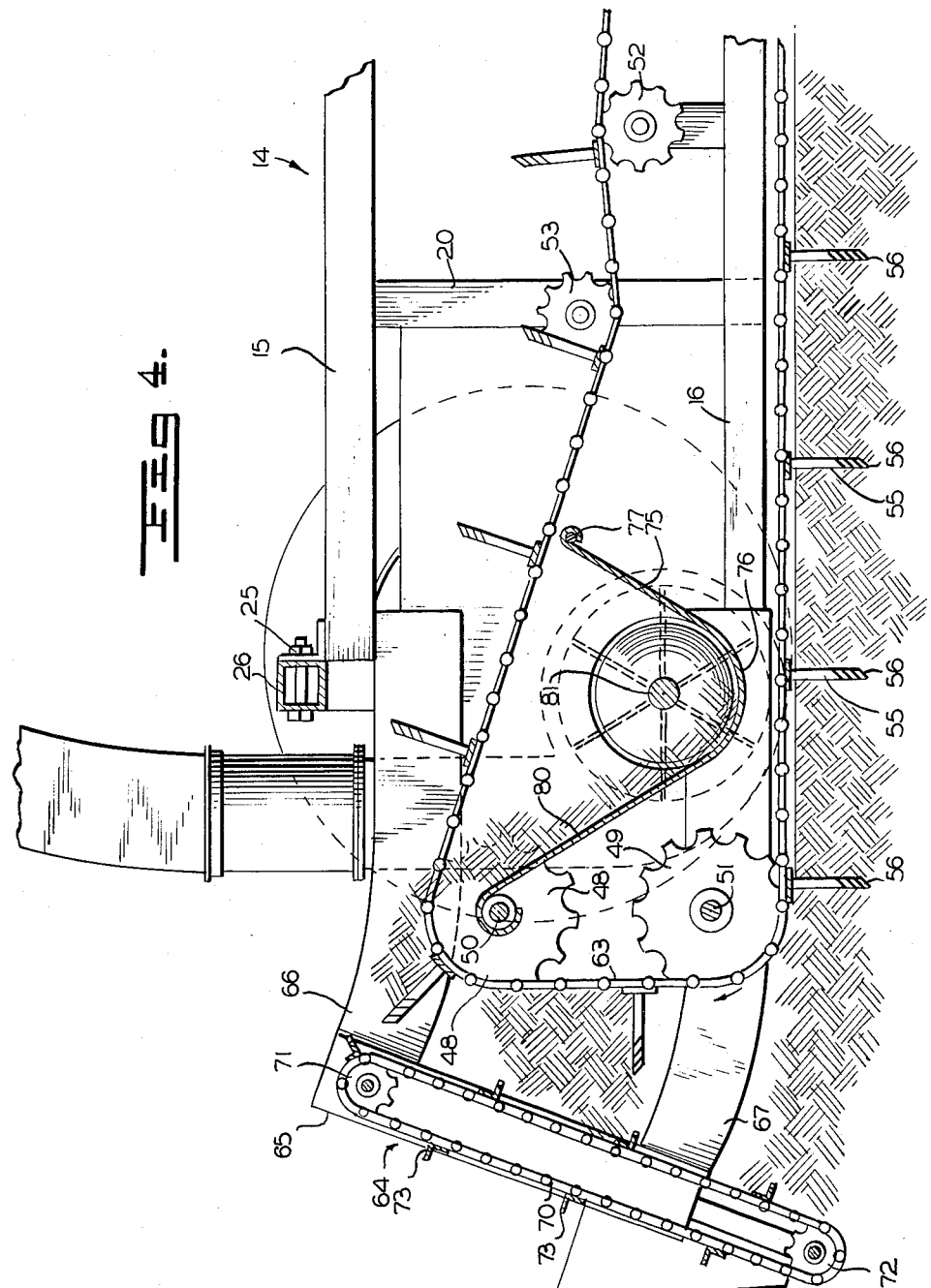

Figure 3 is a vertical cross-sectional view of the apparatus taken on the line 3—3 of Figure 2, Figure 4 is a vertical cross-sectional view of the apparatus taken on the line 4—4 of Figure 3, Figure 5 is a vertical cross section view of the apparatus taken on the line 5—5 of Figure 2, and Figure 6 is a detailed view of the conveyor teeth.

Figure 1:
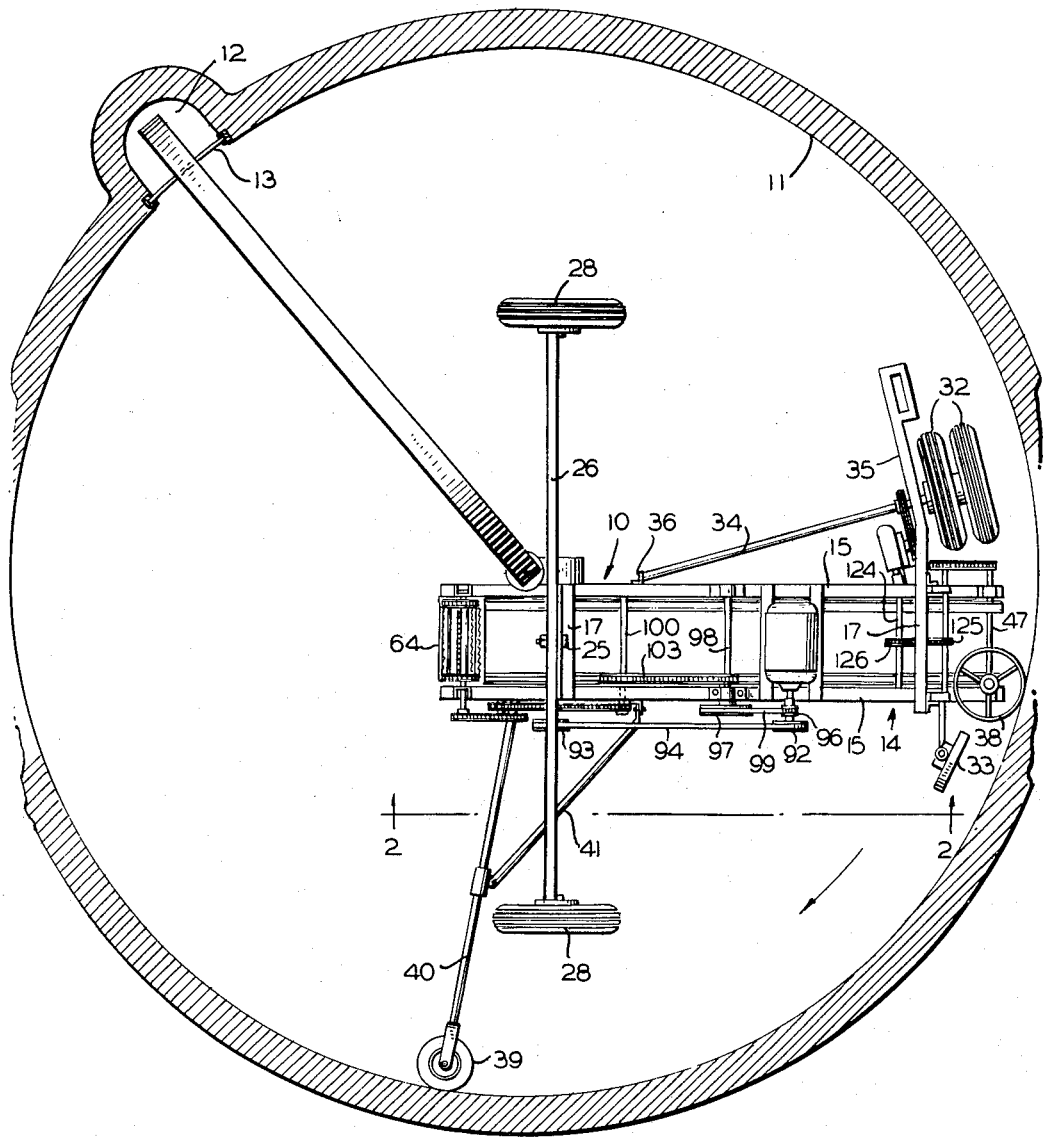
Figure 1 is a top plan view of the apparatus of the invention, operatively positioned in a silo, the latter being shown in section.

In Figure 1 of the drawing, the improved silo unloading apparatus of the invention, designated generally herein by the numeral 10, is illustrated in its operative position in a silo 11, having a discharge spout 12, provided with the usual removable closure doors 13. The apparatus 10 rests on and is supported by the bed of silage in the silo 11 for movement thereon in a manner hereinafter described.

The component parts of the apparatus 10 are carried by a main frame or chassis 14 which is preferably formed as an elongated box-like structure comprising upper and lower longitudinally extending side frame members 15 and 16, connected together at suitable intervals by horizontally extending upper and lower frame members 17 and 18 and vertically extending frame members 19 and 20. In operative position, the frame or chassis 14 is disposed with its inner end adjacent to, but at one side of the vertical axis of the silo, and with its outer end adjacent the confining wall of the silo. Thus the frame 14 extends substantially radially of the silo and when it completes a full revolution about the axis thereof, in a manner to be described, will have moved over the entire surface of the bed of material therein.

Adjacent its inner end, the frame 14 is pivotally connected, as at 25, to a yoke member 26, having depending legs 27 at opposite ends thereof. Rubber tired wheels 28 are rotatably mounted on the lower ends of the arms 27 and are preferably adjustable thereon to vary the height of the inner end of the frame 14 above the surface 29 of the silage 30. By virtue of this arrangement wherein the frame 14 is pivotally supported by the yoke 26 and wheels 28 the frame may seek its own level regardless of the relative heights of the wheels 28 and the resulting angularity of the yoke 26.

At its outer end, the frame 14 is supported by wheels 32, disposed rearwardly of the cutting mechanism hereinafter described, and by the wheel 33, disposed forwardly of such mechanism. The wheels 32 constitute the driving wheels of the apparatus and are preferably rubber tired wheels for more effective gripping action on the surface of the silage. The wheels 32 are fixed to a shaft 34 rotatably mounted in bearings carried by extensions 35 and 36 secured to the frame 14. The shaft 34 is disposed at an acute angle to the frame 14, the arrangement preferably being such that the wheels 32 are toed slightly outwardly toward the wall of the silo for reasons which will appear more clearly hereinafter.

The wheel 33 is rotatably journaled at the lower end of an arm 33a (Fig. 5), carried by an extension 33b secured to the frame 14. The arm 33a is secured to the extension 33b by a clamp 33c, which may be loosened to permit angular, as well as vertical adjustment, of the wheel 33. The wheel 33 rides on the surface of the silage ahead of the cutting mechanism to be described and supports the outer leading edge of the frame 14 at a desired height above such surface.

In order to maintain the apparatus in a predetermined path of swinging movement, guide wheels 38 and 39 are provided. Guide wheel 38 is rotatably mounted on the outer end of the frame 14, as shown in Figs. 1 and 2, for engagement with the wall of the silo and serves to maintain this end of the apparatus at a pre-determined distance from such wall. The guide wheel 39 is rotatably mounted on the end of an arm 40 which is secured to and extends laterally outward from the inner end of the frame 14. The guide wheel 39 is designed to hold the inner end of the frame in pre-determined spaced relation to the wall of the silo and is preferably inclined forwardly, at a slight angle with respect to the frame 14, as clearly shown on Figure 1. A brace 41 may desirably be secured between the arm 40 and frame 14 to strengthen and stiffen the arm.

The mechanism for cutting and moving the silage comprises an endless type chain drag conveyor formed of a pair of horizontally spaced link type chains 43 and 44 (Figs. 2 and 3), connected together at suitable intervals by transverse members 45, secured thereto in any suitable manner. The chains 43 and 44 are trained over a pair of sprockets 46, fixed to a shaft 47, rotatably journaled in the frame 14 at the outer end thereof, and over upper and lower pairs of sprockets 48 and 49 (Figs. 2 and 4), fixed to shafts 50 and 51, rotatably journaled at the inner end of the frame 14. Intermediate idler sprockets 52 and chain tightening sprockets 53 are desirably provided, and these are mounted on the frame 14 for cooperation with the upper runs of the chains 43 and 44, as clearly shown in Fig. 2.

Silage cutting and conveying teeth 55 are secured to the cross members 45 in laterally spaced relation thereon and depend downwardly therefrom for engagement with the bed of silage, as clearly shown in Figs. 5 and 6. The teeth 55 are provided with cutting edges 56, which preferably slope upwardly from front to rear as clearly shown in Fig. 4. Such cutting edges may be formed by suitably beveling the sides of the lower ends of the teeth 55 as shown at 57 in Figs. 5 and 6.

An important feature of the invention is the provision of silage cutting and conveying teeth 55 which progressively and uniformally increase in length from the leading or forward edge of the conveyor to the following or rearward edge thereof. Thus, as shown in Fig. 5, the shortest tooth 55 is located at the right side of the conveyor, which constitutes the leading edge of the apparatus as it swings or rotates about the axis of the silo. The teeth to the left of the shortest one uniformally increase in length and the longest tooth 55 is located at the left of the conveyor as shown in this figure. The purpose of this will be referred to more in detail hereinafter.

In the illustrated arrangement the lower run of the chain drag conveyor moves inwardly in a substantially horizontal plane with the teeth 55 embedded in the silage as clearly shown in Figs. 2 and 4. In the case of densely compacted or frozen silage the resistance to movement of the teeth 55 will be substantial and will tend to swing or cant the teeth to the rear, with consequent buckling of the chains 43 and 44. In order to prevent this, the lower longitudinally extending frame members 16 of the frame 14 are provided with inwardly extending spaced flanges 60 and 61 (Figs. 3, 4 and 5) between which the lower runs of the chains 43 and 44 are confined and held against buckling.

As the lower run of the chain drag conveyor moves inwardly the teeth 55 cut and dislodge the silage to the depth to which the teeth penetrate, and move the dislodged silage to a position adjacent the end of the frame 14. It is then picked up and lifted by an elevating mechanism comprising the vertically extending portion 63 (Fig. 4) of the chain drag conveyor and by an auxiliary chain drag conveyor 64. The conveyor 64 is supported by a frame 65, secured to the frame 14 by connections 66 and 67 and is inclined upwardly and inwardly toward the vertical portion 63 of the chain drag conveyor so that the upper portion thereof is in close proximity to the teeth 55 as they move upwardly and around the sprockets 48. This conveyor may desirably comprise a pair of link chains 70, trained over upper and lower pairs of sprockets 71 and 72, and connected at suitable intervals by cross members 73. The members 73 are preferably formed as angle irons having one of their flanges connected to chains 70 and the other flange suitably notched to form V-shaped teeth.

The elevating mechanism herein above described lifts the silage upwardly to a point adjacent to the top of the apparatus and the teeth 55 carry it over the sprockets 48 where it is discharged into a transversely extending substantially V-shaped trough 75 (Figs. 3 and 4) having a rounded bottom 76. The trough 75 may be supported at one side by the shaft 50 and at the other side by a rod 77 mounted in suitable side wall portions 78 and 79 secured to the frame 14 to act as closures for the ends of the trough.

As the silage falls into the trough 75 and slides down the inclined wall 80 thereof to the curved bottom 76, it is engaged by a screw type conveyor 81 which moves it along the trough through an opening 82, in the side wall 79, into a blower 83. In a preferred construction, the fan or impeller 84 of the blower 83 is mounted on an extension of the shaft 85 of the screw conveyor 81. This provides for relatively rapid rotation of both the conveyor and the impeller so that the silage is quickly evacuated from the trough to the blower.

The impeller 84 is mounted in a housing 86, secured to the side wall portion 79, and provided with a discharge pipe 87, on which a discharge spout 88 is pivotally mounted. The discharge spout 88 is an elongated conduit of any suitable cross-sectional shape and has a curved or bowed configuration, as shown, to permit the apparatus to pass thereunder as it swings around the silo.

Since silage must be continuously discharged through the spout 88 into the silo chute 12 during operation of the apparatus, it is quite apparent that the spout must remain stationary and in a substantially fixed position while the rest of the apparatus is rotating or swinging about the silo. In order to accomplish this, the apparatus is constructed and arranged to rotate or swing about a vertical axis which coincides both with the vertical axis of the silo and the vertical axis of the pivotal connection of the spout 88 to the blower discharge pipe 87.

All moving parts of the apparatus are driven from a single power unit, preferably comprising an electric motor 90 connected with any suitable source of electric motive power through an electrical connector ring arrangement 91 mounted on the delivery chute 88. The motor 90 drives the conveyor 81 and impeller 84 by a pulley and belt arrangement comprising pulleys 92 and 93 (Figs. 1 and 2), fixed respectively to the motor shaft and to the shaft 85, and a V belt 94, trained over these pulleys, and held taut by an idler pulley 95. It will be appreciated that the relative sizes of the pulleys 92 and 93 may be varied, as desired, to rotate the conveyor 81 and impeller 84 at the proper speed.

The chain drag conveyor is driven by a combined belt and pulley and spocket and chain drive. Referring to Figs. 1, 2 and 3, this drive comprises a pulley 96, fixed to the motor shaft, and drivingly connected to a pulley 97, fixed to a shaft 98, by a belt 99. The shaft 98, in turn, is drivingly connected with a shaft 100 by a sprocket and chain drive, comprising sprockets 101 and 102, mounted respectively on the shafts 98 and 100, and a chain 103, trained over these sprockets.

The shaft 100 has an additional sprocket 104 fixed thereto, which is drivingly connected with a sprocket 105, mounted on the chain drag conveyor shaft 50, by a chain 106. This effects rotation of the shaft 50 and the sprockets 48 carried thereby, and the latter, in turn, effect movement of the chain drag conveyor.

The auxiliary conveyor 64 is driven by a sprocket and a chain drive from a shaft 110 having a sprocket 111 fixed thereto, over which the lower run of the chain 106 is trained, as clearly shown in Figs. 2 and 3. The chain 106 thus drives the shaft 110 through its engagement with the sprocket 111 and the shaft 110, in turn, is drivingly connected with the shaft 112 of the conveyor 64, by sprockets 113 and 114, fixed to the respective shafts 110 and 112 and drivingly connected by a chain 115. By virtue of the particular arrangement used it will be noted that the sprocket 114 turns in a direction opposite to the sprocket 105 so that the inner run of the conveyor 64 will move upwardly with the vertical portion 63 of the chain drag to lift the material therebetween upwardly for discharge into the trough 75.

The driving wheels 32 are driven from the chain drag conveyor shaft 47 which, as previously indicated, is rotatably mounted at the outer end of the frame 14. For this purpose, the shaft 47 is provided at one end thereof with a sprocket 120 (Figs. 2 and 5) drivingly connected with a sprocket 121 by a chain 122. The sprocket 121 is fixed on a shaft 123 (Fig. 2) drivingly connected with a shaft 124 by sprockets 125 and 126, fixed to the respective shafts, and a chain 127. The shaft 124 has a worm 128 on one end thereof adapted to mesh with a worm wheel 129 fixed to a shaft 130. The shaft 130, in turn, is drivingly connected with the shaft 34, on which the wheels 32 are mounted by a sprocket and chain drive comprising the sprockets 131 and 132, mounted on the respective shafts 130 and 34, and a chain 133, cooperating with the sprockets 131 and 132.

It will be apparent from the above description that the rates of movement of all moving parts of the apparatus are coordinated one with the other and that any change in the rate of movement of one part will be accompanied by corresponding changes in the rates of movement of the other parts. The coordination of these factors is built into the apparatus and is effectively maintained under all conditions of operation.

*Operation*

When it is desired to unload a silo, the apparatus 10 is hoisted over the silo rim and lowered into position either as a unit, or in a partially dismantled state. Alternatively, the apparatus may be dismantled into a number of component parts, small enough to be brought in through the silo chute or silo openings, and then assembled within the silo.

In operation, the apparatus 10 rests on the surface of the silage, with the guide wheels 38 and 39 in engagement with the wall of the silo, and the vertical axis of the pivotal connection between the discharge spout 88 and blower discharge pipe 87 in substantial alignment with the vertical axis of the silo. The weight of the apparatus will cause the teeth 55 on the lower run of the chain drag conveyor to penetrate the surface of the silage to a depth dependent on the vertical adjustment of the wheels 28 on the arms 27 and the vertical adjustment of the wheel 33 on the extension 33b. The supporting wheels 28 and 33 and the driving wheels 32 will of course, rest on the surface of the silage in the silo. Operation of the apparatus may be initiated or stopped merely by closing or opening the switch to the motor 90.

Actuation of the motor 90 initiates operation of the screw conveyor 81, the fan 84 and the chain drag, by the driving connections hereinabove described. The chain drag, in turn, initiates operation of the driving wheels 32 which begin to rotate at a relatively slow speed to turn or rotate the apparatus in a clockwise direction, as viewed in Fig. 1. Simultaneously with such rotary movement the teeth 55 on the lower run of the chain drag conveyor begin to move inwardly through the silage cutting and dislodging same and moving it toward the inner end of the frame 14. The simultaneous turning movement of the apparatus and inward movement of the lower run of the chain drag conveyor impart to the silage engaging teeth 55, a multi-directional movement having both a rotary component and a substantially radial component. This assists in dislodging the silage for movement inwardly to the elevating mechanism.

As the apparatus rotates about the axis of the silo, the silage is first cut and dislodged to a depth corresponding to the shorter teeth 55. As the rotation of the apparatus continues the depth of the cut is gradually increased as the progressively longer teeth 55 are advanced. By so graduating the lengths of the teeth 55, the stresses on the teeth are equalized and the load on the conveyor distributed substantially uniformally across the width thereof. This eliminates strain on any one section of the conveyor and minimizes any tendency of a side pull on the conveyor. In addition, this makes possible an arrangement wherein the ends of the teeth 55 closely approach the wall of the silo to remove frozen silage therefrom as the chain drag conveyor moves around the sprockets 46 at the outer end of the frame 14.

The silage which has been cut and moved inwardly by the teeth on the lower run of the drag chain conveyor is picked up by the elevating mechanism, comprising the vertically extending portion 63 of the chain drag conveyor and the auxiliary conveyor 64, and is lifted upwardly therebetween and over the sprockets 48 for discharge into the trough 75. As the material falls downward in the trough 75, it is quickly evacuated therefrom by the rapidly rotating screw conveyor 81 and delivered to the blower 83 through the opening 82. The material is then pneumatically conveyed to the spout 88 which discharges it into the silo chute 12 for delivery into a wagon or other conveyance.

It has been found that the apparatus of the invention will cut, dislodge and move silage much more quickly and effectively than prior apparatus of this type. Thus, upon each complete revolution thereof the apparatus of the present invention, cuts, dislodges and moves from the entire surface of the bed of material in the silo, a layer of silage approximately 2½ inches or more in depth, depending upon the length of the teeth 55 and the depth to which they are set to penetrate by adjustment of the wheels 28 and 33. The apparatus thus removes a substantial quantity of material upon each revolution thereof, and travels relatively slowly in doing this so that frozen silage may be effectively cut both from the bed of material and from the outside walls of the silo. The depth of the cut may, of course, be varied by adjustment of the supporting wheels.

It has further been found that the capacity of the apparatus for discharging the loosened material is much greater if the material is introduced into the blower in the manner hereinbefore described, rather than if the blower picks up the loosened silage directly from the bed of material in the silo. As a result, the capacity of the present apparatus is much greater, and in some cases, double of that of prior apparatus for this purpose.

While a preferred embodiment of the invention has been disclosed, the invention is not to be construed as limited to the specific details illustrated and described except as included in the following claims.

I claim:

1. Apparatus for unloading a silo comprising a frame, means for supporting and guiding said frame for rotatable movement around the vertical axis of a silo above a bed of material therein, means mounted on said frame for movement therealong from positions adjacent a wall of the silo to positions adjacent the center thereof, said means being engageable with the silage during such movement to cut and dislodge a portion of same and move it to a central collecting area, receiving means carried by said frame adjacent said collecting area, means for removing the material from said collecting area and delivering it to said receiving means, and pneumatic discharge means associated with said receiving means for effecting discharge of the silage.

2. Apparatus for unloading a silo comprising a frame, a receiving trough mounted on said frame, silage dislodging and conveying means mounted on said frame and adapted to dislodge and move silage to said receiving trough, a blower connected to said receiving trough, and conveyor means mounted in said receiving trough for moving material therein to said blower for pneumatically discharging same.

3. Apparatus for unloading a silo comprising a frame, wheels mounted on said frame for supporting same on the surface of silage in a silo, one of said wheels comprising a driving wheel, means for driving said driving wheel to effect movement of said frame in a circular path about the axis of the silo above the bed of material therein, guide wheels on said frame adapted to engage the walls of the silo to maintain the frame in its circular path of movement, an endless conveyor mounted on said frame for movement therealong during rotation thereof and provided with a plurality of longitudinally spaced sets of teeth to dislodge and move the silage for discharge from the silo, said conveyor being mounted for movement between positions adjacent the wall of the silo and positions adjacent the axis thereof whereby silage dislodged by said teeth is moved inwardly to a central collecting area.

4. Apparatus of the type set forth in claim 3 in which some of said supporting wheels are vertically adjustable with respect to said frame to vary the depth of penetration of said silage dislodging and conveying means.

5. Apparatus for unloading a silo comprising a frame, a plurality of supporting wheels mounted on said frame for engagement with the surface of silage in the silo and forming the sole means for supporting the frame in the silo, said wheels including a driving wheel, means for driving said driving wheel to rotate the frame about an axis substantially coincident with the vertical axis of the silo, guide wheels mounted on the frame for engagement with the wall of a silo to maintain the frame in a predetermined circular path of movement, an endless chain drag conveyor mounted on said frame for movement therealong between positions adjacent the wall of the silo and positions adjacent the axis thereof, longitudinally spaced sets of teeth carried by said conveyor and adapted to cut and dislodge a portion of the silage and move it to a central collecting area during movement of said conveyor, and means mounted on said frame for discharging such silage from the silo.

6. Apparatus for unloading a silo comprising a frame, a plurality of wheels mounted on said frame for supporting same on the surface of silage in the silo, said wheels including a driving wheel, means for driving said driving wheel to rotate the frame about an axis substantially coincident with the vertical axis of the silo, guide wheels mounted on the frame for engagement with the wall of a silo to maintain the frame in a predetermined circular path of movement, a chain drag conveyor mounted on said frame for movement therealong, longitudinally spaced sets of teeth carried by said conveyor and adapted to cut and dislodge a portion of the silage and move it to a central collecting area during movement of said conveyor, the teeth of each of said sets progressively decreasing in length in the direction of rotary movement of said frame, and means mounted on said frame for discharging such silage from the silo.

7. Apparatus for unloading a silo comprising a frame, driving means mounted on said frame for moving same, guiding and supporting means mounted on said frame for cooperative engagement with the wall of a silo and the bed of material therein, said driving, guiding and supporting means being adapted to turn said frame in a predetermined path of movement about the vertical axis of said silo, a chain drag conveyor mounted on said frame for movement therealong between positions adjacent a wall of said silo and positions adjacent the axis thereof and including means adapted to cut, dislodge and move a portion of the silage to a central collecting area, a collecting receptacle mounted on said frame adjacent to said central collecting area, means for moving said material from said central collecting area and delivering it to said collecting receptacle, a blower associated with said collecting receptacle, and means for delivering material from said collecting receptacle to said blower for discharge from the silo.

8. Apparatus for unloading a silo comprising a frame, means cooperative with the wall of a silo and the surface of the material therein for guiding and supporting said frame for turning movement about the vertical axis of a silo, a chain drag conveyor mounted on said frame for movement between a position adjacent to the wall and center of a silo, means carried by said chain drag and engageable with the silage to cut and move same to a central collecting area, a receptacle mounted on said frame adjacent the central collecting area, elevating means for lifting material from said central collecting area and delivering it to said receptacle, a screw conveyor in said receptacle for moving material therefrom, and a blower for receiving material moved from said receptacle and pneumatically discharging it to the silo chute.

9. Apparatus of the type set forth in claim 8 including an elongated discharge spout having its inner end pivotally connected to the discharge of said blower and its outer end spaced therefrom for positioning in the discharge chute of a silo, the intermediate portion of said chute being arranged to permit passage of the apparatus thereunder as it rotates about the silo.

10. Apparatus for unloading a silo comprising a frame, means supporting said frame for rotatable movement in a silo above the surface of a bed of material therein, an endless conveyor mounted on said frame and movable therealong between positions adjacent the wall of the silo and positions adjacent the axis thereof as said frame is rotated, and a plurality of longitudinally spaced sets of teeth carried by said conveyor and adapted to cut and dislodge a portion of the silage and move it to a central collecting area during movement of said conveyor, the teeth of each of said sets progressively decreasing in length in the direction of rotary movement of said frame.

References Cited in the file of this patent

UNITED STATES PATENTS

| | | |
|---|---|---|
| 940,583 | Capers | Nov. 16, 1909 |
| 1,479,990 | Keys | Jan. 8, 1924 |
| 1,550,311 | Foster | Aug. 18, 1925 |
| 1,958,661 | Fulmer | May 15, 1934 |
| 2,498,143 | Struckmann | Feb. 21, 1950 |
| 2,595,333 | Clapp | May 6, 1952 |
| 2,651,438 | Peterson | Sept. 8, 1953 |
| 2,671,696 | McLean | Mar. 9, 1954 |
| 2,677,474 | Long | May 4, 1954 |
| 2,678,241 | Miller | May 11, 1954 |
| 2,719,058 | VanDusen | Sept. 27, 1955 |

FOREIGN PATENTS

| | | |
|---|---|---|
| 694,555 | France | Dec. 5, 1930 |